(12) United States Patent
Leonardi

(10) Patent No.: US 6,556,680 B1
(45) Date of Patent: Apr. 29, 2003

(54) METHOD FOR AUTHORIZATION CHECK

(75) Inventor: Robert Leonardi, Spånga (SE)

(73) Assignee: Telefonaktiebolaget L M Ericsson, Stockholm (SE)

(*) Notice: Subject to any disclaimer, the term of this patent is extended or adjusted under 35 U.S.C. 154(b) by 0 days.

(21) Appl. No.: 09/367,530

(22) PCT Filed: Feb. 5, 1998

(86) PCT No.: PCT/SE98/00206

§ 371 (c)(1),
(2), (4) Date: Dec. 8, 1999

(87) PCT Pub. No.: WO98/37663

PCT Pub. Date: Aug. 27, 1998

(30) Foreign Application Priority Data

Feb. 19, 1997 (SE) ................................................ 9700587

(51) Int. Cl.⁷ ................................................ G06F 11/30
(52) U.S. Cl. .................. 380/247; 713/161; 713/168; 713/182; 713/200; 713/201
(58) Field of Search .................. 713/161, 168, 713/182, 200, 201; 380/247

(56) References Cited

U.S. PATENT DOCUMENTS

| | | | | |
|---|---|---|---|---|
| 5,283,828 A | * | 2/1994 | Saunders et al. | 713/192 |
| 5,327,497 A | * | 7/1994 | Mooney et al. | 235/382 |
| 5,335,278 A | * | 8/1994 | Matchett et al. | 380/248 |
| 5,596,718 A | * | 1/1997 | Boebert et al. | 713/201 |

FOREIGN PATENT DOCUMENTS

| | | |
|---|---|---|
| EP | 0708547 | 4/1996 |
| WO | WO 94/11849 | 5/1994 |
| WO | WO 96/05702 | 2/1996 |
| WO | WO 96/13814 | 5/1996 |
| WO | WO 96/32700 | 10/1996 |

\* cited by examiner

*Primary Examiner*—Thomas R. Peeso
(74) *Attorney, Agent, or Firm*—Alfred J. Mangels

(57) ABSTRACT

A method for verifying the authority of a user to access by a mobile telephone either a payment system or a data system. A user card that carries a microprocessor and a memory that includes an encryption key is inserted into a mobile telephone to initiate a connection with the payment system or the data system via the mobile telephone system network. Using the mobile telephone keypad, the user enters an identifying number that is unique to that user, and the microprocessor performs a calculation using the encryption key and the user identifying number to obtain a calculated signature that is transmitted over the mobile telephone network to a computer connected with the payment system or the data system to which access is desired. The system computer performs a calculation using the unique user number and the same encryption key that is maintained in the system computer memory for the particular user to obtain a system-computer-calculated signature, which is then compared by the system computer with the transmitted signature. If the two signatures match, access to the payment system or the data system is granted to enable the user to perform a desired transaction.

8 Claims, 1 Drawing Sheet

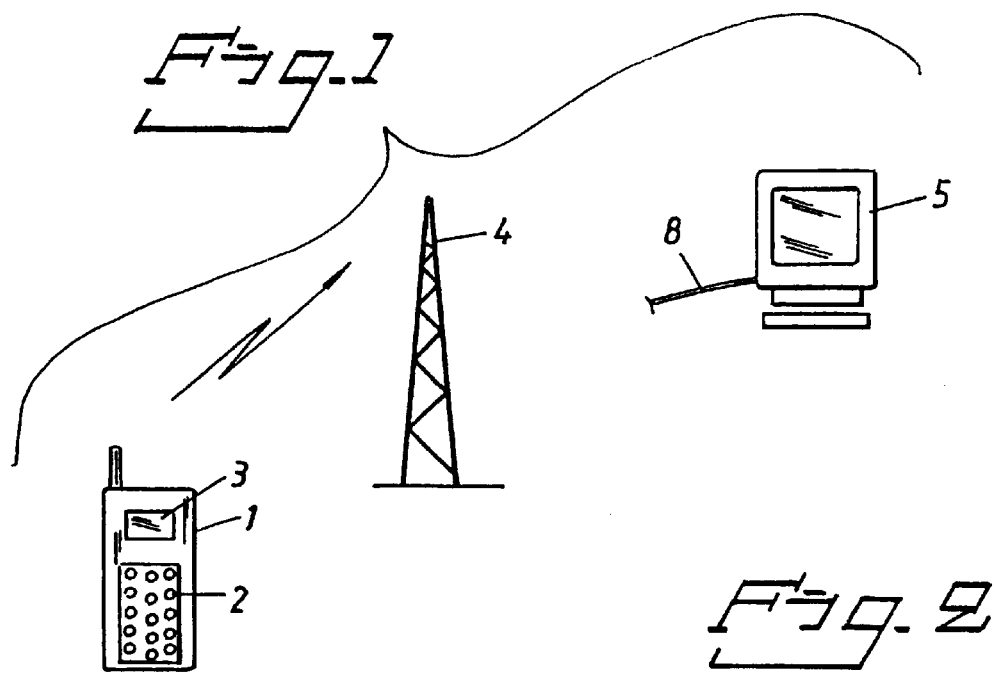
Fig. 1
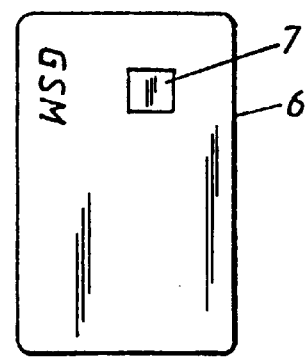
Fig. 2
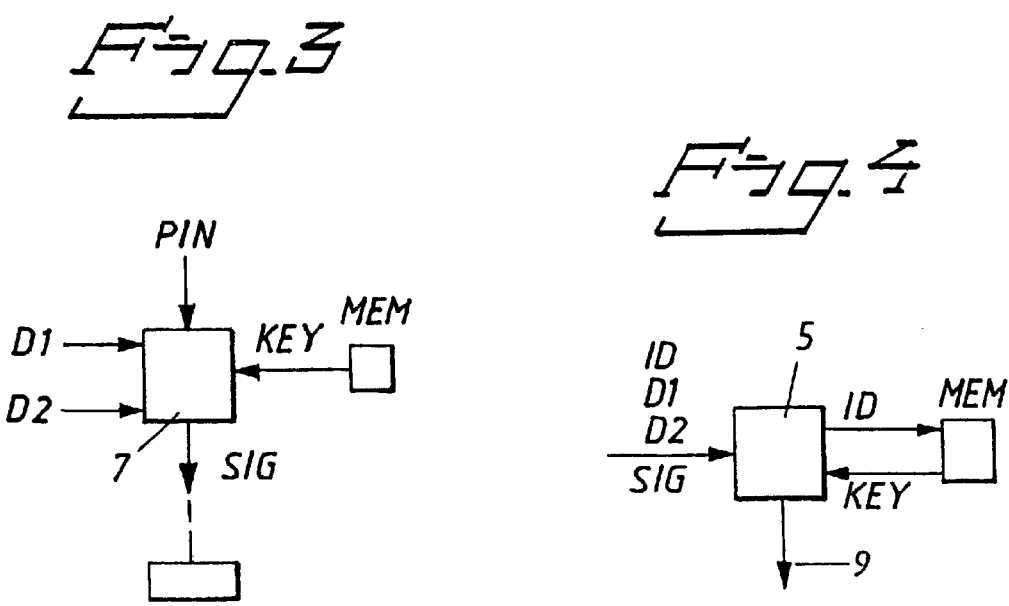
Fig. 3
Fig. 4

METHOD FOR AUTHORIZATION CHECK

BACKGROUND OF THE INVENTION

1. Field of the Invention

The present invention relates to a method for checking the authorization of a person, in his/her capacity as user of a system such as a payment system or a data system.

2. Description of the Related Art

Systems now in existence are used to check the authorization of a person in connection with payment. One such system is used within the Swedish Postal Service for payments made via postgiro. In accordance with this system, the customer receives a so-called SmartCard and a card reader for it. An encryption key is stored on the SmartCard, and it can be read by a microprocessor on the SmartCard after a PIN code has been entered.

The encryption key is stored hot only on the SmartCard, but also at the Swedish Postal Service postgiro department where it is linked to a specific person.

When a payment is to be made, the user keys in the PIN code, the number of the account to, which the payment is to be sent and the amount in question. The microprocessor performs a calculation based on the amount, the account number and the encryption key in accordance with the so-called DES (Data Encryption Standard) algorithm, wherewith a signature is generated by the calculation. After this is done, the amount, the account number and the signature are transferred to the postgiro department in a suitable manner, via data, mail or fax, for example.

The postgiro department receives the information and then performs the same calculation as set forth above and compares the result with the signature that was transferred. If the comparison results in a match, an authorized person, i.e., the holder of the SmartCard, is deemed to have ordered the transaction, wherewith the transaction is executed. The transaction is executed by transferring money from the postgiro account of the SmartCard holder to the specified postgiro account to which the payment is to be made.

This payment system is automatic, and it can be used to make payments at any time of day or night.

Desirably, it should be possible for the described system to be used by a person to show authorization for use of a system other than a postgiro or bank payment system. For example, it should be possible for a person to show authorization for accessing a data system by entering his/her PIN code and two numbers other than an amount and account number, and then transferring them together with the signature to the data system. If the data system contains the encryption key the signature can be calculated, and if a match is found the person to whom the SmartCard has been issued can be deemed to be the person who entered the items of information and is therefore authorized to access the data system.

However, a significant disadvantage of the described system is that the user must have access to a SmartCard and a special card reader in order make a payment.

The present invention solves this problem.

SUMMARY OF THE INVENTION

The present invention thus relates to a method for checking authorization that incorporates a way to impart to a so-called smart card (SmartCard) an encryption key or equivalent key, and incorporates a way to have a microprocessor, using the encryption key and at least one identifying number, perform a calculation whose result comprises a signature. The signature together with the identifying number is transferred to a system for which authorization is to be shown. The system includes a computer in which the encryption key is stored, and the computer performs the calculation in order to obtain the signature. The system-computer-obtained signature is compared by the computer with the previously mentioned transmitted signature to verify authorization of the user. The smart card is a so-called SIM-card (Subscriber Identity Module) telephony. A memory included on the SIM-card is, in a first step, provided with unique information containing a unique identity in order to communicate telephonically using a mobile telephone. In in a second step, the SIM-card memory is provided with the encryption key. A system for which authorization is to be shown is provided with the same encryption key linked to the unique identity carried on the SIM-card, and in response to the entry of an appropriate code and at least the identifying number via the keyboard on the mobile telephone, a microprocessor on the SIM-card is induced to perform the calculation resulting in the signature.

The present invention is not limited to any special field with regard to showing authorization. Instead, it is applicable for all kinds of systems such as payment systems, data systems, systems that check authorization before allowing entrance etc.

The description of the present invention that follows, however, is for a system that provides payment via postgiro.

BRIEF DESCRIPTION OF THE DRAWING

The system is described in greater detail below, partially in connection with an example of an embodiment shown on the attached drawing, where:

FIG. 1 shows the included hardware schematically.

FIG. 2 shows a SIM-card.

FIG. 3 shows a schematic view of a block diagram for which a function is described.

FIG. 4 shows a schematic view of a block diagram for which another function is described.

DESCRIPTION OF THE PREFERRED EMBODIMENTS

FIG. 1 shows a mobile telephone 1 of an appropriately known type which is intended for use in a GSM system or an equivalent telephone system where a so-called smart card (Smartcard) is used together with the mobile telephone to form a usable communication unit. In the GSM system, the smart card is a SIM-card. The mobile telephone includes a keyboard 2 and a display 3.

FIG. 1 also shows a telephone system base station 4 for wireless communication with mobile telephone 1. In addition, a computer 5 is shown which belongs to the system with which the mobile telephone is to communicate.

FIG. 2 also shows a SIM-card 6 that incorporates a microprocessor 7 together with its memory.

The present invention relates to a method for checking authorization of a user to access and to conduct transactions on a remote, data-containing system, wherewith a so-called smart card (SmartCard) is provided with an encryption key KEY or an equivalent key, and wherewith a microprocessor 7 is induced to perform, based on the encryption key and at least one identifying number that is unique to the user. A calculation whose result comprises a signature. The identifying number is entered into the microprocessor from a keyboard. The signature, together with the said identifying number, is then transmitted to a system for which authorization is to be shown, which system includes a computer 5 in which said encryption key has been stored. Computer 5 is induced to perform the said calculation to obtain the said signature. Computer 5 then compares this latter computer-obtained signature with the first-mentioned transmitted signature. If the two signatures match, authorization of the user is verified.

The method is thus based on the user having a SmartCard that incorporates an identity unique to the user and an encryption key. It is presupposed that only the user him/herself will use the SmartCard.

In accordance with the invention, the said smart card is a so-called SIM-card 6 intended for mobile telephony. In a first step, unique information that includes a unique identity (IMSI as set forth in the GSM standard) is entered into memory 7 in said SIM-card 6 in such a way as to support telephonic communication using a mobile telephone. This appropriately takes place in the same as way as presently being used in the GSM system.

In a second step, the memory in SIM-card 6 is provided with the said encryption key. This memory can be the existing memory 7 or an extra memory. This is accomplished in a way that corresponds with the way the previously mentioned identity was entered, but it should preferably be carried out by the person who controls the system for which authorization is to be shown.

In accordance with the invention, the system for which authorization is to be shown is provided with the same encryption key linked to an identity for the SIM-card. Here, for example, the IMSI used for the SIM-card can serve as its unique identity ID. Alternatively, the encryption key in the said system can be linked to some other identity such as the user's telephone number, a customer number or a name what is essential is that the system must later be able to retrieve the correct encryption key for a specified user.

The invention is further characterized in that when a suitable code is entered along with at least the said identifying number via keyboard 2 on mobile telephone 1, a microprocessor on the said SIM-card is induced to perform the said calculation resulting in the said signature. The microprocessor can be the regular microprocessor that is normally incorporated into the SIM-card, but it can also be a separate microprocessor on the SIM-card. In the latter case, however, the separate microprocessor is linked to regular microprocessor 7 on the SIM-card.

The term "suitable code" means, for example, a code that is entered in order to put the mobile telephone in a mode in which the microprocessor is induced to proceed with calculation of the signature.

Obviously, then, it suffices to have a mobile telephone and to be able induce a microprocessor in a SIM-card to perform a calculation using an encryption key to obtain an electronic signature that can be transferred to a system for which authorization is sought. The system conducts an equivalent calculation, thereby determining whether or not authorization can be verified. As a result, no other equipment is needed to show authorization, as mentioned in the introduction.

After authorization has been verified in the aforesaid manner, the mobile telephone can be used to have the system perform services such as making payments in situations where the system is, for example, part of a postgiro system.

In accordance with a preferred embodiment, the said identifying number includes identifying at least two identifying numbers. This improves security significantly. When the invention is applied to perform payments made via postgiro, for example, one of the numbers can comprise the number of the account that is to receive a payment while the other can comprise the amount to be paid.

This is illustrated in FIG. 3 by numbers D1 and D2 which are sent to the microprocessor in the mobile telephone via the keyboard on the mobile telephone. When the numbers are entered, the microprocessor retrieves the encryption key KEY from memory MEM and conducts the aforesaid calculation which results in said signature SIG.

In accordance with a preferred embodiment, the signature calculated by the mobile telephone together with at least the said identifying numbers is caused to be transferred via mobile telephone network base station 4 to said system.

In accordance with an alternative embodiment, the signature calculated by the mobile telephone together with at least the said identifying numbers is caused to be transferred directly from the mobile telephone to said system via an interface between the mobile telephone and the system such as a computer 5 belonging to the system. The interface can include a cable 8 or an infrared link or some other suitable link.

In accordance with a preferred embodiment, the mobile telephone is caused to present the calculated signature on the mobile telephone display. In such case, the user can, for example, enter the said identifying numbers and signature on a keyboard belonging to a computer that belongs to the system.

In accordance with a highly preferred embodiment, a special PIN code is assigned to the SIM-card in such a way that it can be used to enable the card for said calculation of the signature. This further enhances security since the user must a) know his/her PIN code to start the mobile telephone and b) know his/her PIN code to access and start the calculation process used to obtain the electronic signature.

To facilitate the making of correct payments, for example, and in accordance with a preferred embodiment, the mobile telephone is caused to present the said identifying numbers on its display. An account number and an amount, for example, can be displayed before the signature is calculated.

When the signature has been calculated, data is thus transferred to the system. Herewith, as illustrated in FIG. 4, a separate user identity ID, such as a telephone number, an IMSI or some other identity, is always transferred. Signature SIG is also always transferred. Moreover, at least one identifying number D1 or D2 is always transferred. If payments are involved, account number D1 and amount D2 are transferred. When this has happened, the system computer 5 retrieves the encryption key KEY that is linked to identity ID from a memory MEM and then calculates the signature. When this is done, the computer compares the, computer calculated signature with the signature SIG that was transferred from the mobile telephone. If the two signatures match, the user is deemed to have shown his/her authorization, whereupon payment 9 is made.

To further enhance security, a serial number can be included as one of the said identifying numbers. If payments are involved, calculation is then performed on the basis of an account number, to an amount and a serial number. The serial number can range from 00 to 99. When the first payment is made, serial number 00 is used, when the second payment is made serial number 01 is used and so forth. Correspondingly, the system increments the serial number by counting the number of payment transactions originating from the same user.

This means that each payment transaction generates a unique signature even if the same amount is paid to the same account number more than once.

It is obvious that the present invention, by using a mobile telephone, permits authorization to be checked vis-a-vis an arbitrary system. It also permits payments via postgiro or a bank at any time of day or night with excellent security and without requiring any extra equipment beyond a mobile telephone.

A number of different embodiments have been described above. However, it is obvious that the identifying numbers on which calculation of the signature is based can be numbers other than those exemplified above. Moreover, information in addition to what is set forth above can be transferred from the mobile telephone to the system in order to verify authorization.

The present invention shall thus not be considered limited to the embodiments set forth above. Instead it can be varied within the scope set forth in the attached claims.

What is claimed is:

1. A method for verifying the authority of a user to access and to conduct transactions with a computer-containing data system by utilizing a mobile telephone capable of receiving a user card and the data system by the use of a user card that includes a microprocessor, a memory, and an encryption key contained in the user-card memory, said method comprising the steps of:

a. entering a user-access code and at least one user-unique number into the mobile telephone keypad;
   b. initiating a calculation in the microprocessor based upon the encryption key contained in the memory carried by the user card and the user-unique number to obtain a microprocessor-calculated signature, wherein different user-unique numbers result in different signatures;
   c. transmitting the microprocessor-calculated signature and the user-unique number to the data system computer;
   d. initiating a calculation in the system computer based upon the user-unique number and an encryption key that is contained in a memory associated with the system computer and that is the same as the encryption key contained in the user-card memory;
   e. comparing in the system computer the microprocessor-calculated signature with the system-computer-calculated signature; and
   f. permitting user access to the data system when the microprocessor-calculated signature matches the system-computer-calculated signature.

2. A method in accordance with claim 1, wherein the at least one user-unique number includes at least two user-unique numbers.

3. A method in accordance with claim 1, wherein the signature calculated by the microprocessor together with at least the the at least one user-unique number are transmitted to the data system over a mobile telephone network.

4. A method in accordance with claim 1, including the step of transmitting the microprocessor-calculated signature directly from the mobile telephone to the data system via a computer interface between the mobile telephone and the data system.

5. A method in accordance with claim 1, including the step of displaying the microprocessor-calculated signature on a display carried by the mobile telephone.

6. A method in accordance with claim 5, including the step of displaying the at least one user-unique number on the mobile telephone display.

7. A method in accordance with claim 1, wherein the user card is a SIM-card for use with a mobile telephone.

8. A method in accordance with claim 7, including the step of imparting to the SIM-card a special PIN code to enable the microprocessor for the calculation of a signature.

* * * * *